US008023266B2

United States Patent
Russell et al.

(10) Patent No.: US 8,023,266 B2
(45) Date of Patent: Sep. 20, 2011

(54) AC PHOTOVOLTAIC MODULE AND INVERTER ASSEMBLY

(75) Inventors: Miles Clayton Russell, Lincoln, MA (US); Gregory Allen Kern, Lafayette, CO (US); Ruel Davenport Little, Concord, MA (US); Zachary Adam King, Townsend, MA (US)

(73) Assignee: GreenRay Inc., Westford, MA (US)

( * ) Notice: Subject to any disclaimer, the term of this patent is extended or adjusted under 35 U.S.C. 154(b) by 34 days.

(21) Appl. No.: 12/468,468

(22) Filed: May 19, 2009

(65) Prior Publication Data
US 2009/0296348 A1 Dec. 3, 2009

Related U.S. Application Data

(60) Provisional application No. 61/128,219, filed on May 20, 2008.

(51) Int. Cl.
*H05K 7/20* (2006.01)
(52) U.S. Cl. .................. 361/702; 361/679.54; 361/690; 361/103; 136/244; 136/251
(58) Field of Classification Search ............. 361/679.46, 361/679.54, 702–714, 717–724, 736, 752, 361/82, 103–106, 605, 609, 625, 679; 165/46, 165/80.3, 104.33, 185; 174/16 R, 16.3, 252; 363/15, 26, 39, 17, 63–65, 73–80, 13, 55, 363/60, 71, 40, 243–246, 251, 255, 249, 363/252, 292, 253; 323/266, 285, 299, 905, 323/906; 307/11, 31, 43, 64–66, 82, 72, 307/44, 75, 77, 112, 143–148; 52/173.3, 52/302.1; 324/260, 538; 29/832, 840, 842
See application file for complete search history.

(56) References Cited

U.S. PATENT DOCUMENTS

| | | | | |
|---|---|---|---|---|
| 4,273,107 A * | 6/1981 | Methvin | ........................ | 126/600 |
| 4,392,009 A * | 7/1983 | Napoli | ........................... | 136/251 |
| 5,951,785 A * | 9/1999 | Uchihashi et al. | ............. | 136/251 |
| 6,111,189 A * | 8/2000 | Garvison et al. | .............. | 136/244 |
| 6,593,521 B2 * | 7/2003 | Kobayashi | ..................... | 136/244 |
| 6,654,261 B2 | 11/2003 | Welches et al. | | |
| 6,750,391 B2 * | 6/2004 | Bower et al. | ................... | 136/244 |
| 6,791,024 B2 | 9/2004 | Toyomura | | |
| 6,804,127 B2 | 10/2004 | Zhou | | |
| 6,892,370 B2 * | 5/2005 | Flohr | ........................... | 716/126 |
| 6,966,184 B2 * | 11/2005 | Toyomura et al. | ........... | 60/641.8 |
| 7,397,653 B2 * | 7/2008 | Taylor | ........................... | 361/676 |
| 7,738,228 B2 * | 6/2010 | Taylor | ........................... | 361/103 |
| 7,768,154 B2 * | 8/2010 | Taylor et al. | .................... | 307/82 |
| 2002/0078991 A1* | 6/2002 | Nagao et al. | .................. | 136/251 |
| 2002/0179140 A1* | 12/2002 | Toyomura | ..................... | 136/251 |
| 2002/0186020 A1* | 12/2002 | Kondo et al. | ................. | 324/538 |
| 2006/0124167 A1* | 6/2006 | Fan et al. | ........................ | 136/251 |
| 2008/0283118 A1* | 11/2008 | Rotzoll et al. | ................ | 136/251 |

FOREIGN PATENT DOCUMENTS

| | | |
|---|---|---|
| DE | 20012131 | 3/2001 |
| WO | WO 2008/108909 | 9/2008 |
| WO | WO 2009/120955 | 10/2009 |

* cited by examiner

*Primary Examiner* — Michael V Datskovskiy
(74) *Attorney, Agent, or Firm* — Pandiscio & Pandiscio (57) ABSTRACT

An AC photovoltaic module includes a DC photovoltaic module for converting solar energy to DC electrical power, and an inverter for converting DC electrical power to AC electrical power, the inverter being adapted for connection to a frame portion of the module and being sized and configured, and provided with arrangements of electrical components thereof, to dispense heat from the inverter, whereby to prolong operational life and reliability of the inverter.

20 Claims, 8 Drawing Sheets

AC PHOTOVOLTAIC MODULE AND INVERTER ASSEMBLY

CROSS-REFERENCE TO RELATED APPLICATION

This application claims priority from U.S. Provisional Patent Application No. 61/128,219, filed May 20, 2008 in the names of Miles Clayton Russell, Gregory Allen Kern, Ruel Davenport Little and Zachary Adam King.

BACKGROUND OF THE INVENTION

1. Field of the Invention

This invention relates to solar electric power systems, and more particularly to an AC photovoltaic module including an inverter sized and configured so as to collect less heat, and to dissipate heat, and to operate under relatively cool conditions.

2. Description of the Prior Art

It is known to provide an AC photovoltaic module including a DC photovoltaic module for converting solar energy to DC electrical energy, and an inverter for converting the DC electrical energy to AC electrical energy, and for feeding the AC electrical energy to an AC grid. See, for example, International Patent Application No. PCT/US2009/038547.

The inverter typically is mounted at or near the center of the DC photovoltaic module. It is known that the center of the DC module suffers the greatest elevation of heat during a sunny day, and after the sun has lowered and disappeared, the greatest change in temperature.

The extremes of temperatures of the inverter lead to a relatively short life span of the inverter. Inasmuch as each AC module is provided with an inverter, keeping all inverters active in an array of numerous modules can be problematic.

An object of the invention is therefore to provide an AC photovoltaic module having an inverter of a beneficial size and configuration, and mounted on the DC photovoltaic module at a relatively cool peripheral portion of the DC module.

A further object of the invention is to provide an arrangement of components in the inverter such as to concentrate heat in the inverter on one side thereof, and to provide heat sink means for dissipating the heat from that side to the surrounding environment.

A still further object of the invention is to provide film capacitors in the inverter circuitry, which operate more reliably and more effectively, with less internal resistance, and therefore generally less heat, than the same assembly circuitry with commonly used electrolytic capacitors.

SUMMARY OF THE INVENTION

With the above and other objects in view, a feature of the present invention is the provision of an AC photovoltaic module including a DC photovoltaic module for converting solar energy to DC electrical power, and an inverter for converting DC electrical power to AC electrical power, the inverter being adapted for connection to a peripheral frame portion of the DC photovoltaic module and being sized and configured to dispense heat therefrom, to prolong operational life and reliability of the inverter.

In accordance with a further feature of the invention, there is provided an AC photovoltaic module comprising a DC photovoltaic module for producing DC electrical power, and an inverter for converting the DC electrical power to AC electrical power, wherein the inverter is mounted on the DC photovoltaic module, and wherein the inverter comprises a narrow elongated body mounted proximate an outer edge of the DC photovoltaic module, such that an elongated side of the inverter is fixed in abutting relationship to the outer edge of the DC photovoltaic module.

In accordance with a further feature of the invention, there is provided an AC photovoltaic module comprising a DC photovoltaic module for producing DC electrical power, and an inverter for converting the DC electrical power to AC electrical power, the inverter having film capacitor means therein for storing and releasing electrical energy, and the inverter being mounted on the DC photovoltaic module proximate an edge of the DC photovoltaic module.

In accordance with a still further feature of the invention, there is provided an inverter assembly for converting a DC electric power input to an AC electrical power output, the inverter assembly comprising means for receiving the DC electrical power from a DC power source, one or more film capacitors for filtering input current switching ripple of a DC/DC converter, the DC/DC converter being adapted to convert input voltage from the DC power source to voltage suitable for a DC/AC inverter, a second set of one or more film capacitors for filtering switching ripple output of the DC/DC converter and input switching ripple of the DC/AC inverter, the DC/AC converter being adapted to convert DC power to AC current and feed the AC current into an AC power grid.

In accordance with a still further feature of the invention, there is provided an inverter assembly comprising means for receiving DC electrical power from a DC power source, a DC/AC inverter adapted to convert the DC electrical power to AC electrical power, and a set of one or more film capacitors for (a) filtering switching ripple of input current to the DC/AC inverter, and for (b) filtering energy difference between the inverter DC input power and the inverter AC output power, and the DC/AC inverter being adapted to feed AC current into an AC power grid.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of the invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent, wherein corresponding reference characters indicate corresponding parts throughout the several views of the drawings, and wherein.

DESCRIPTION OF THE PREFERRED EMBODIMENTS

Figure 1:
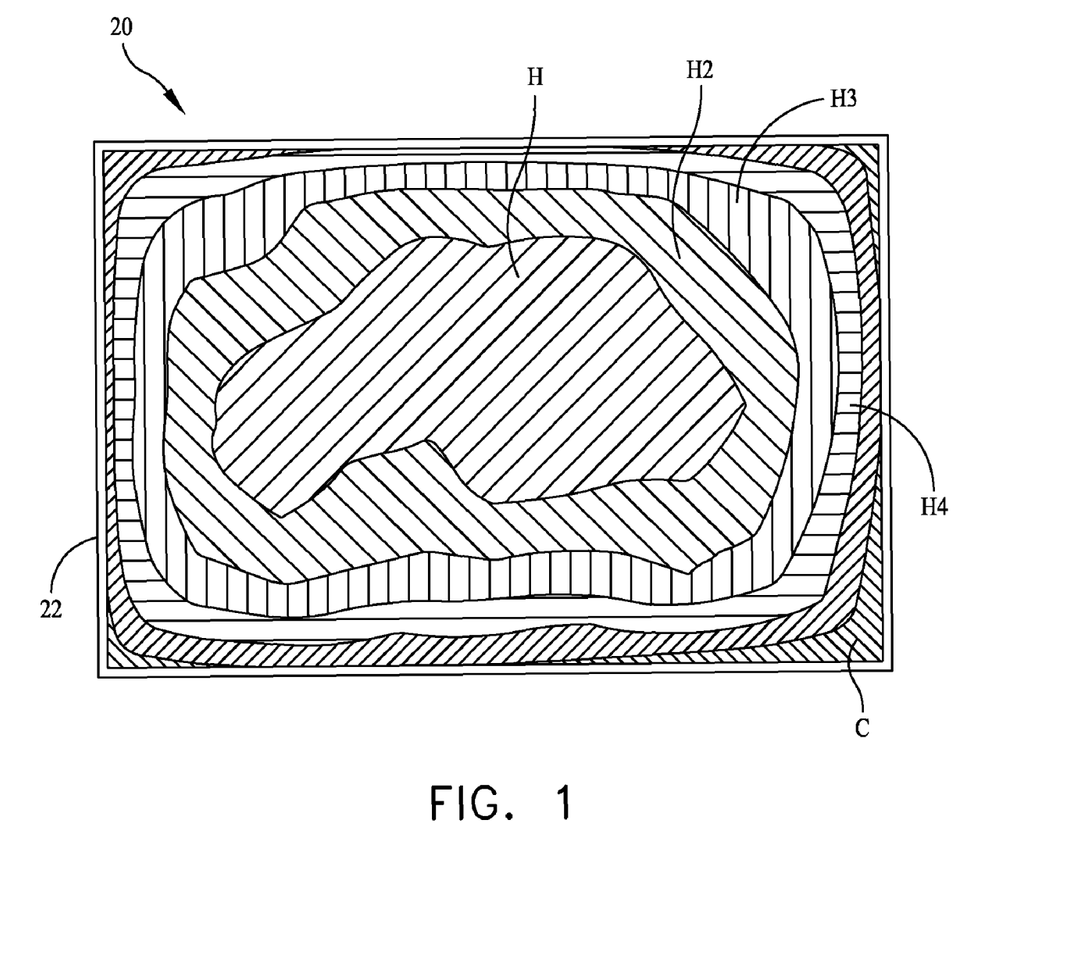
FIG. 1 is a plan view of a framed photovoltaic module, illustrating typical gradients of heat exhibited by a module subjected to sunlight.

Referring to FIG. 1, it will be seen that a DC photovoltaic module 20 illuminated by sunlight, and in the absence of air flow, will exhibit gradients of heat, with a hottest area H appearing in a generally central area of the module. Extending outwardly from the central area are progressively cooler areas, H2, H3, H4, and a coolest area C at an outermost edge of the module which is typically bounded by a frame 22.

At sunless times, and particularly at night time, the module 20 can cool to ambient, and below ambient, temperatures with the central area of the module experiencing the greatest temperature drop. Such change in temperature, particularly over an extended time, is conducive to condensation occurring in the module, which can lead to freeze-thaw mechanized stress in the unit, corrosion, and/or loss of insulation resistance. Accordingly, the most beneficial location for an inverter is proximate the frame 22, that is, in an area well removed from the central area of the module 20.

Figure 2:
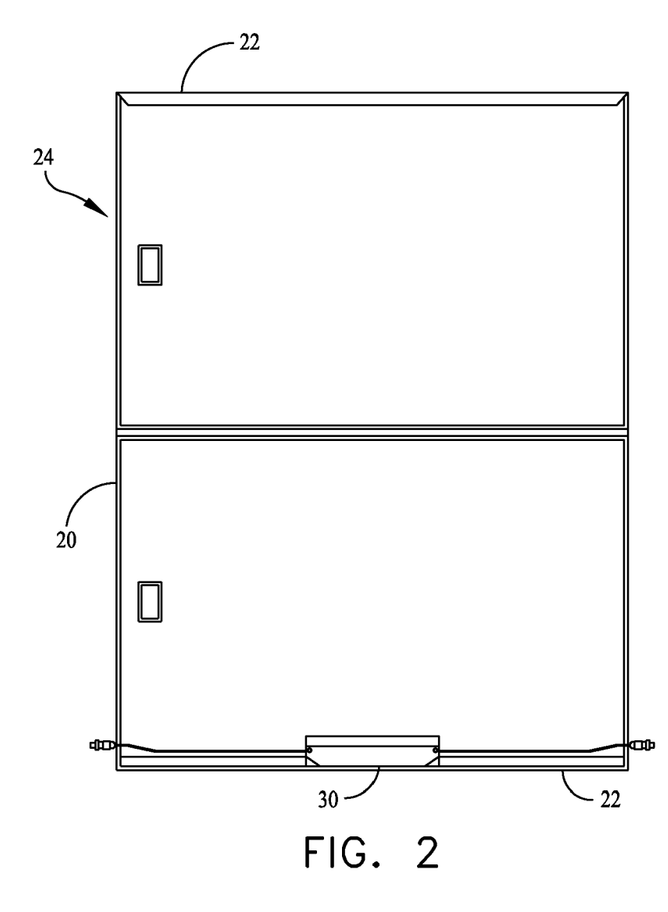
FIG. 2 is a back dimensional view of an AC photovoltaic module, including an inverter mounted on a frame portion of the module.

As shown in FIG. 2, an AC photovoltaic module 24 includes a DC photovoltaic module 20 and an inverter 30, the DC module converting solar energy to DC electrical power, and the inverter converting DC electrical power to AC electrical power.

Figure 3:
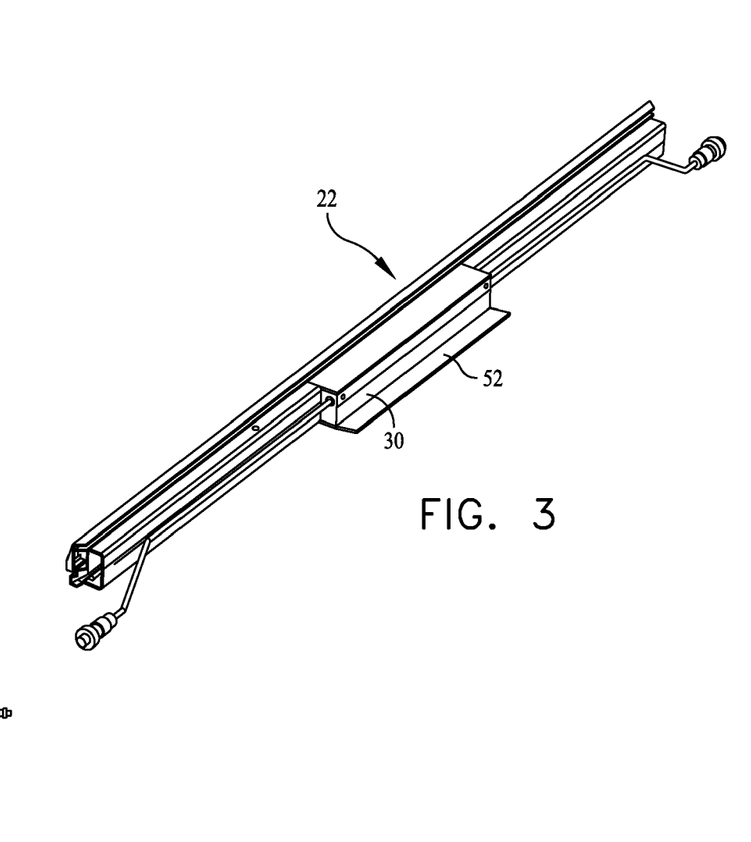
FIG. 3 is a perspective view of a frame portion of a photovoltaic module with an inverter fixed thereto.

Referring to FIGS. 2 and 3, it will be seen that in accordance with the invention an inverter 30 is provided which is mechanically attachable to the frame member 22.

The inverter 30 is of a narrow elongated configuration, such that throughout the length of the inverter, the inverter is disposed in the coolest area C of the DC module 20. Further, the inverter 30 is mounted on a back portion of the frame 22 so as to be out of direct sunlight. Still further, the inverter is spaced from the back of the solar cells of the module 20.

The frame 22 is typically of metal, usually aluminum, which provides a heat sink for the inverter 30 mounted thereon. Thus, heat from the inverter is transferred throughout the frame 22 which, in turn, is located in the coolest region of the module 20.

The narrow, elongated configuration of the inverter 30, typically about 12 inches in length and 2×2 inches in cross-section, permits an extended inverter-to-frame contact surface so that heat is readily transferred to the frame and much less likely to build up in the inverter.

Figure 4:
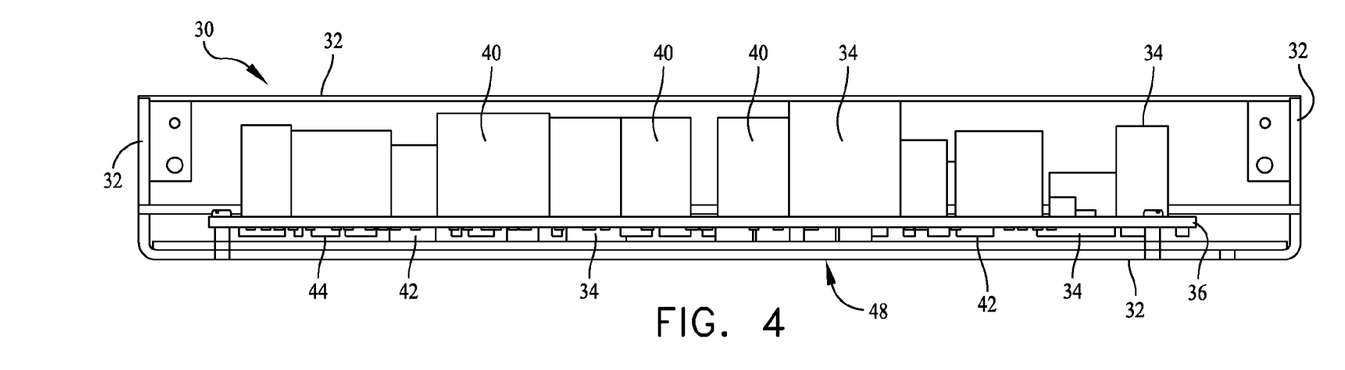
FIG. 4 is a length-wise cross-sectional view of the inverter of FIG. 3.

Referring to FIG. 4, it will be seen that the inverter 30 comprises a housing 32 in which is disposed a series of electrical components 34 known in the art. The electrical components 34 are mounted on an elongated circuit board 36 extending throughout most of the length of the housing 32.

Within the inverter housing 32, the electrical components 34 are disposed in a manner facilitating the removal of heat from the inverter. With that in view, the cooler and taller components 40, such as inductors and capacitors are mounted on a first side 44 of the circuit board 36, while heat-producing and shorter components 42, such as diodes and transistors, are mounted on a second side 46 of the circuit board 36.

Figure 5:
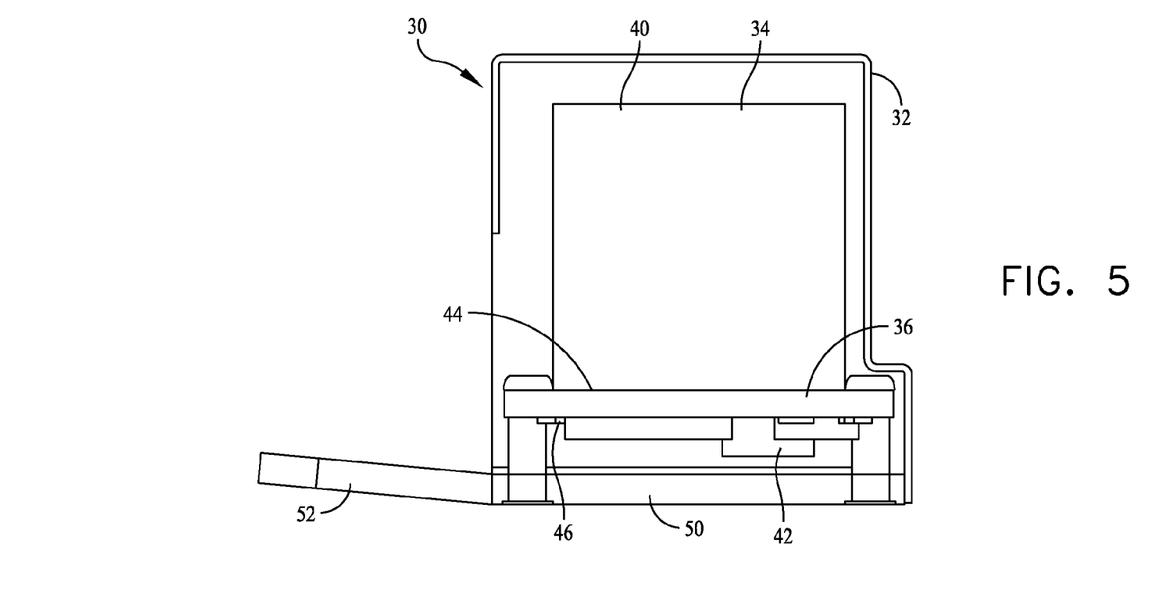
FIG. 5 is a width-wise cross-sectional view of the inverter of FIG. 4.

Thus, as seen in FIGS. 4 and 5, the heat-producing components 40 are necessarily disposed proximate a wall 48 of the housing 32, the wall 48 thereby serving as a heat sink for dissipation of heat generated internally of the inverter 30.

To further expedite the removal of heat from the inverter 30, there may be provided in addition to, or instead of the housing wall 48, an inverter heat sink 50 (FIG. 5) for conveying heat from inside the inverter housing 32 to the surrounding environment. The heat sink 50 may be provided with a plate portion 52 (FIGS. 3 and 6) extending outwardly from the inverter housing 32, and/or may be provided with a portion 54 (FIG. 6) extending from the heat sink 50 into the housing 32 proximate the "hot" components 42.

Figure 6:
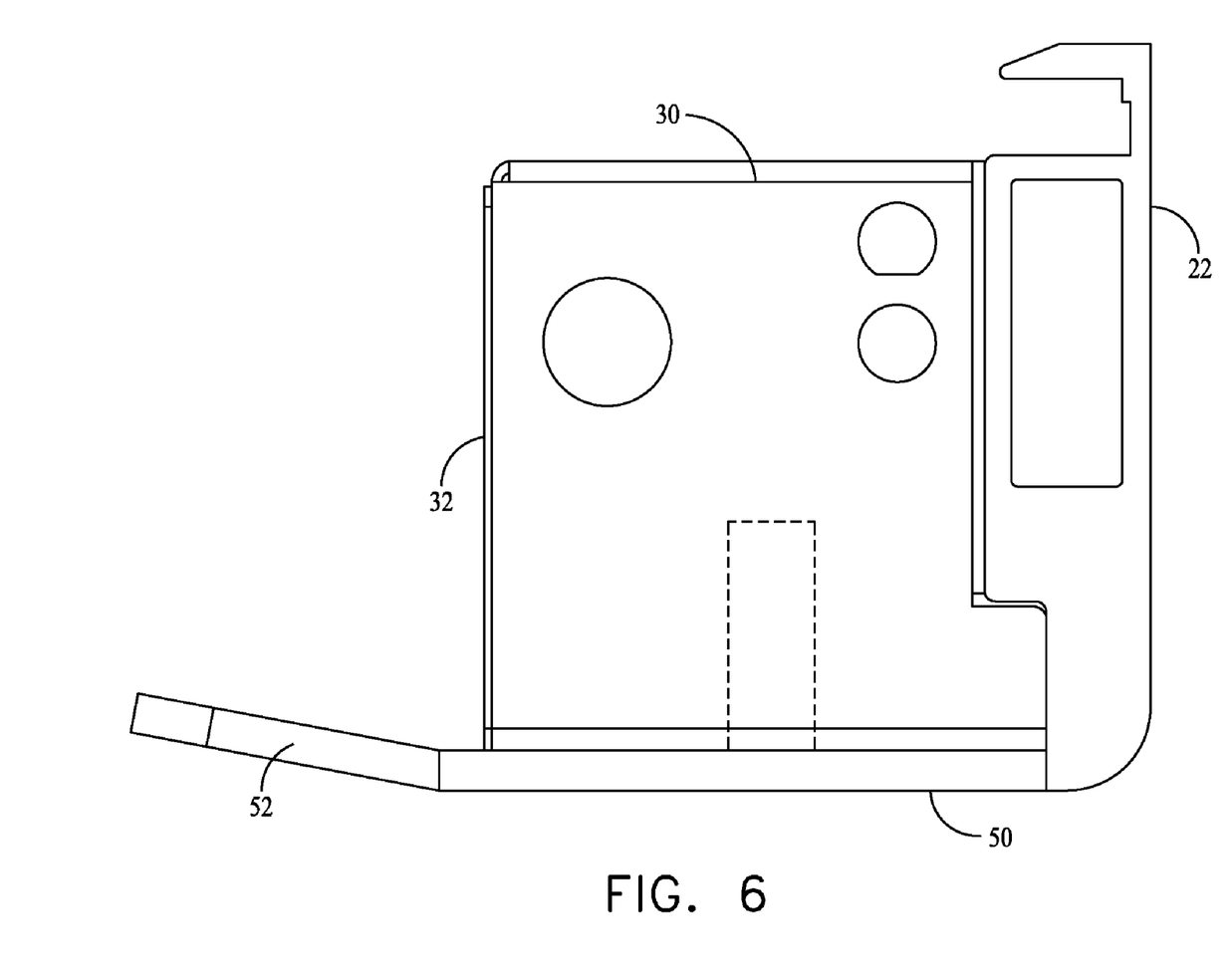
FIG. 6 is an end view of an inverter mounted on a frame member, and a heat sink in the form of a plate fixed to the inverter and extending therefrom, and in phantom shows an optional heat sink feature.

The heat sink 50 preferably is of aluminum and of a thickness of about 0.125 inch.

To still further expedite the removal of heat from the inverter 30, the wall 56 of the inverter housing 32, which faces away from the module frame 22, may be provided with a highly emissive coating or treatment (FIG. 6) to increase radiative heat transfer from the inverter.

To still further expedite the removal of heat from the inverter 30, the cavity of the inverter may be filled with pottant, which provides heat transfer away from the hot components. In addition, the pottant provides thermal mass which limits temperature excursions of the hot components and the rate of change of the thermal components under varying generation of the DC source.

There is thus provided an inverter which, by nature of its size and configuration and location, and the arrangement of its internal components, provides a longer life cycle than was heretofore customary.

Another avenue by which to extend the life of the inverter is to avoid the use of historically troublesome electronic components. The most vulnerable component at present is the state-of-the-art electrolytic capacitor, which is inexpensive and adapted to store a relatively large amount of energy, but is known to deteriorate in a typical AC module environment of high temperature, temperature cycling, and voltage spikes.

Figure 7:
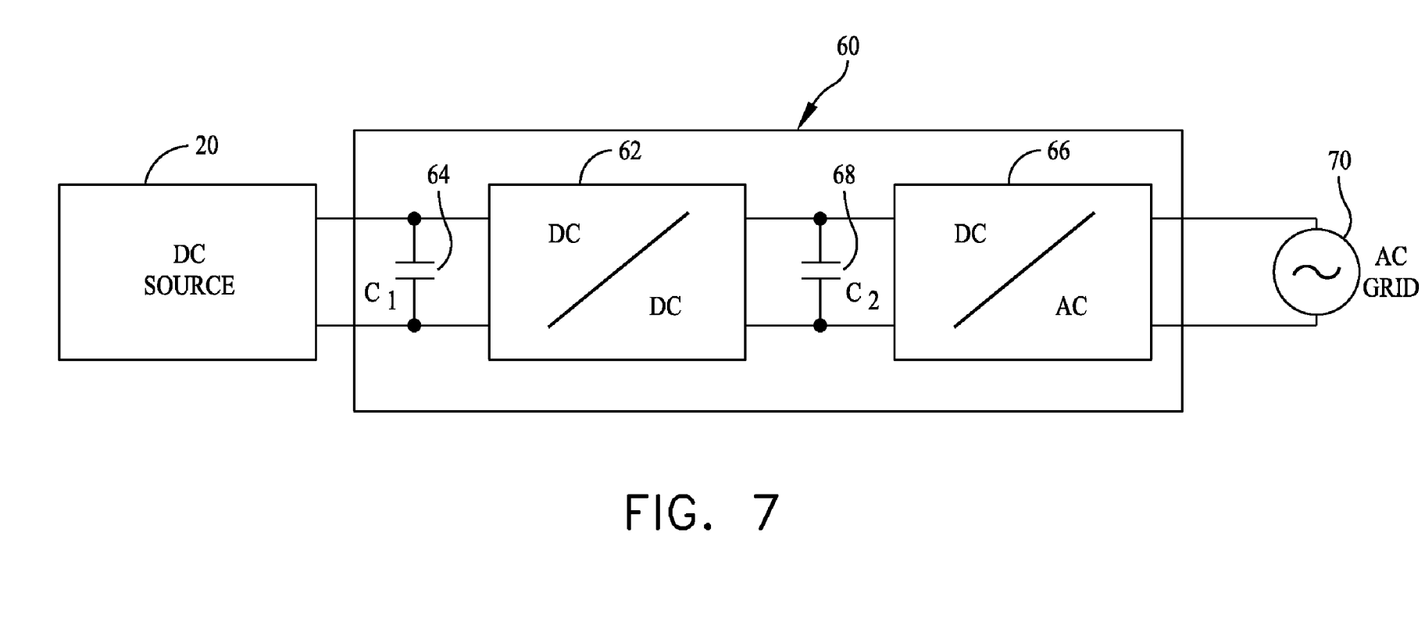
FIG. 7 is a diagrammatic view of an inverter adapted to receive DC electrical current from a DC source and to provide AC electrical current to an AC grid.
Figure 8:
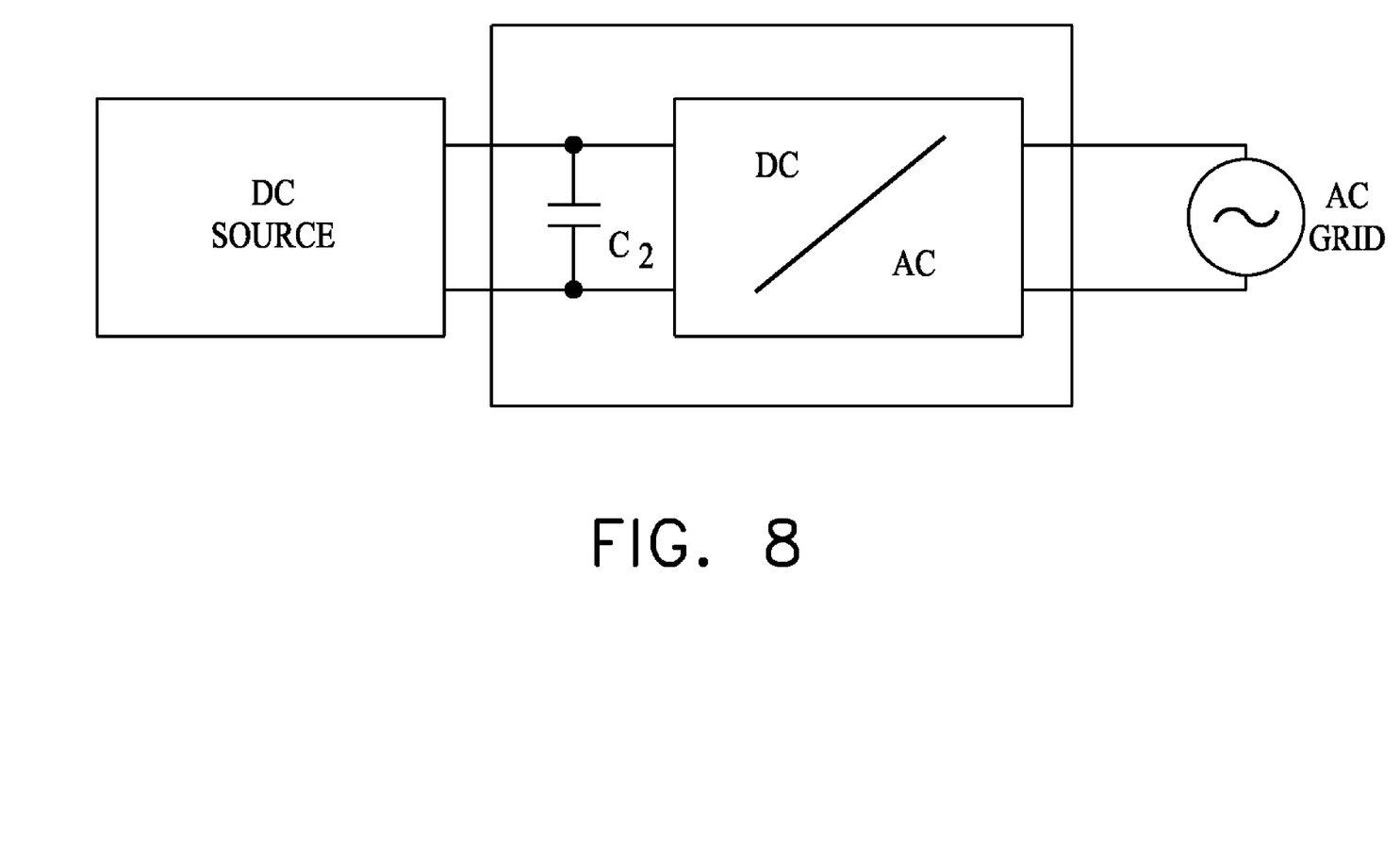
FIG. 8 is a diagrammatic view of an alternative inverter adapted to receive DC electrical current from a DC source and to provide AC electrical current to an AC grid.

In FIG. 7, there is shown an inverter 60 in electrical communication with a DC source, which may be a DC photovoltaic module, wind, hydro, battery, fuel cell, or the like. Between the DC source and the DC/DC converter 62 is a capacitor 64, used to filter the input current switching ripple of the DC/DC converter 62. The DC/DC converter 62 converts the input voltage from the source to a voltage level suitable for a DC/AC inverter 66. Between the DC/DC converter 62 and the DC/AC inverter 66 is a further capacitor 68, for filtering the switching ripple output of the DC/DC converter 62 and the input switching ripple of the DC/AC inverter 66.

Figure 9:
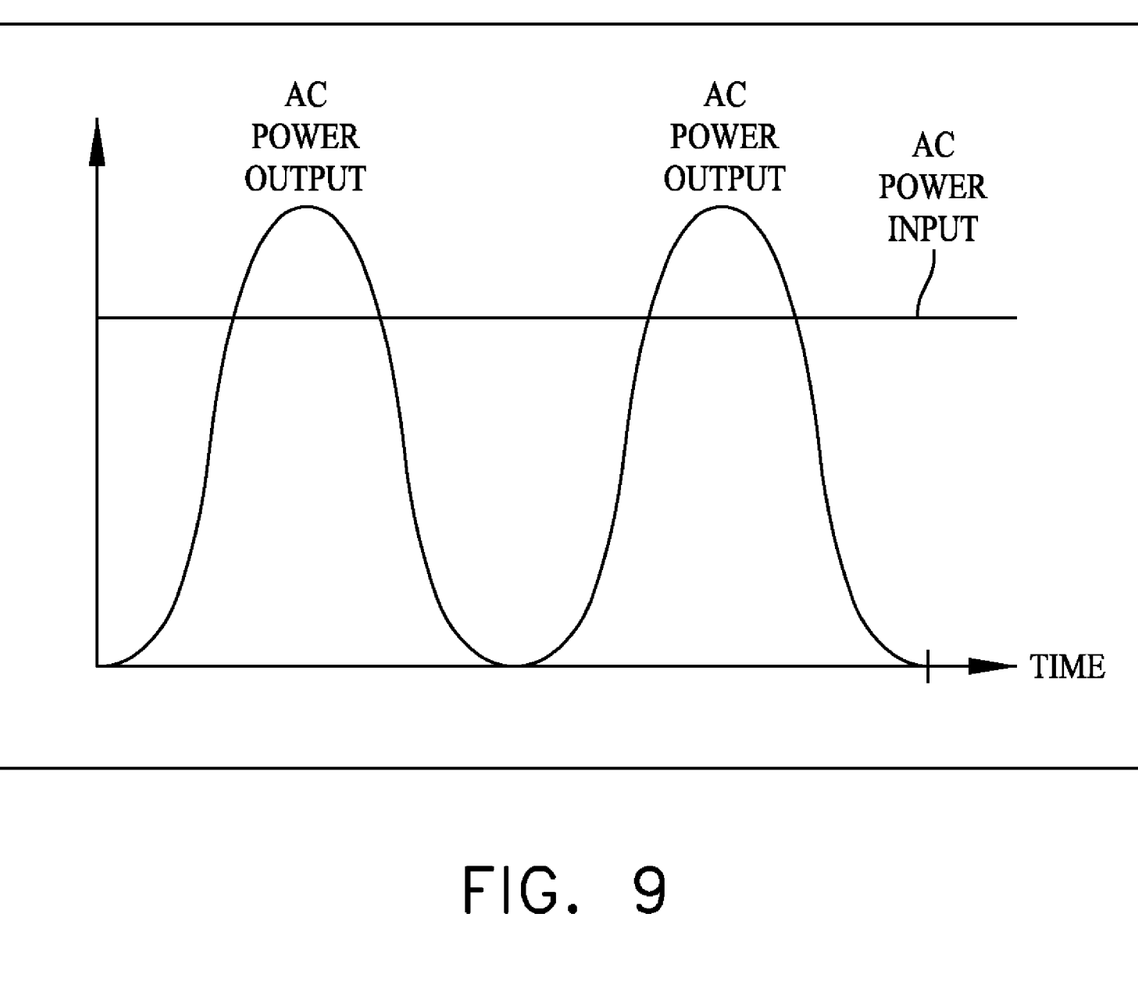
FIG. 9 is a graphical illustration of DC input power, constant with time, and AC output power pulses.
Figure 10:
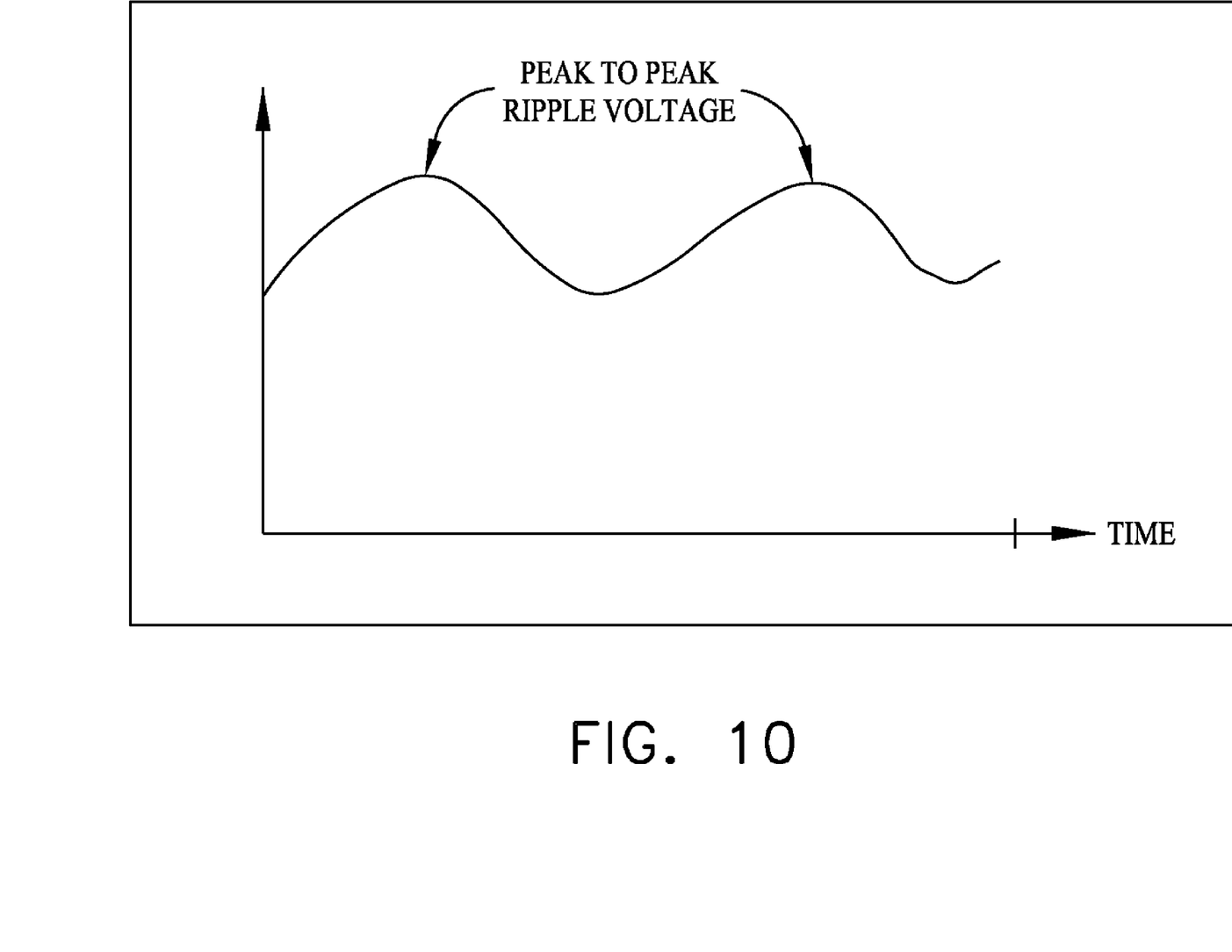
FIG. 10 is a graphical illustration showing ripple voltage that typically appears on an energy storage capacitor over time.

The capacitor 68 may also be used as a main energy storage element to make up for any difference in input DC power and output AC power as a function of time; refer to FIGS. 9 and 10.

The DC/AC inverter 66 converts a DC voltage to an output AC current which is injected into an AC power grid 70. In the AC power grid 70, voltage is typically regulated by a utility or a local generation facility.

As noted above, the DC source may be a photovoltaic module 20. The capacitor 64 is a film capacitor for filtering the input current ripple of the DC/DC converter 62. The DC/DC converter 62 is a full bridge converter. The capacitor 68 stores the difference in energy input from the DC input to the AC output. This difference in energy causes a ripple voltage to appear on capacitor 68. The ripple voltage on capacitor 68 is sinusoidal under ideal operating conditions, at twice the frequency of the AC grid 70.

The DC/AC inverter 66 is a full bridge inverter operated in discontinuous conduction mode. The DC/AC inverter 66 is operated such that the output current is a controlled low (5%) total harmonic distortion current wave-form. The AC grid 70 is a 120 volt 60 Hertz AC circuit.

It will be understood that many changes in the details, materials, steps and arrangements of parts, which have been herein described and illustrated in order to explain the nature of the invention, may be made by those skilled in the art within the principle and scope of the invention as explained in the appended claims.

What is claimed is:

1. An AC photovoltaic module comprising:
    a DC photovoltaic module for producing DC electrical power; and
    an inverter for converting the DC electrical power to AC electrical power;
    wherein said inverter is mounted on said DC photovoltaic module;
    wherein said inverter comprises a narrow elongated body adapted to be mounted proximate an outer edge of said DC photovoltaic module such that an elongated side of said inverter is fixed in abutting relationship to the outer edge of said DC photovoltaic module;
    wherein said inverter is provided with no more than one elongated circuit board extending substantially throughout the length of said inverter;
    wherein a series of electrical components are mounted on said circuit board; and
    wherein cooler and taller electrical components thereof are mounted on a first side of said circuit board, and shorter and heat-producing components thereof are mounted on a second side of said circuit board.

2. The AC photovoltaic module in accordance with claim 1, and further comprising a frame member defining the outer edge of said DC photovoltaic module, and wherein said inverter is adapted to be fixed to said frame member.

3. The AC photovoltaic module in accordance with claim 2 wherein said frame member is of metal.

4. The AC photovoltaic module in accordance with claim 3 wherein said metal is at least in part aluminum.

5. The AC photovoltaic module in accordance with claim 2 wherein said inverter is configured complementarily to said frame member.

6. The AC photovoltaic module in accordance with claim 1 wherein said inverter is of a length about six times the width of said inverter and, the width being generally equal to the height of said inverter.

7. The AC photovoltaic module in accordance with claim 1 wherein said cooler and taller electrical components comprise at least inductors and capacitors, and said shorter and heat-producing components comprise at least diodes and transitors.

8. The AC photovoltaic module in accordance with claim 1 wherein said AC photovoltaic module further comprises a heat sink proximate to said heat-producing components.

9. The AC photovoltaic module in accordance with claim 1 and further comprising a housing substantially enclosing said circuit board and said electrical components.

10. The AC photovoltaic module in accordance with claim 8 wherein said heat sink comprises a metal plate.

11. The AC photovoltaic module in accordance with claim 10 wherein said metal is, at least in part, aluminum.

12. The AC photovoltaic module in accordance with claim 10 wherein said heat sink plate extends beyond a housing enclosing said heat-producing components.

13. The AC photovoltaic module in accordance with claim 9 wherein said housing is substantially filled with pottant enclosing said circuit board and said electrical components electrically and with the thermal mass.

14. The AC photovoltaic module in accordance with claim 8 wherein said heat sink comprises a portion thereof extending into said housing.

15. The AC photovoltaic module in accordance with claim 6 wherein the length of said inverter is about twelve inches, the width of said inverter is about two inches, and the height of said inverter is about two inches.

16. The AC photovoltaic module in accordance with claim 2 wherein said inverter is adapted for mechanical attachment to said module frame member.

17. An AC photovoltaic module comprising:
    a DC photovoltaic module for producing DC electrical power; and
    an inverter for converting the DC electrical power to AC electrical power;
        said inverter having film capacitor means therein for storing and releasing electrical energy;
        said inverter being mounted on the DC photovoltaic module proximate an edge of the DC photovoltaic module;
    wherein said inverter comprises:
        an elongated narrow housing; and
        a single elongated circuit board disposed in said housing;
        said film capacitor means being mounted on a single side of said circuit board;
    wherein said circuit board is disposed proximate an outer wall of said inverter, and a heat sink is fixed to said inverter outer wall for carrying heat away from said inverter.

18. The AC photovoltaic module in accordance with claim 17 wherein said heat sink comprises a plate extending outwardly from said inverter housing.

19. The AC photovoltaic module in accordance with claim 18 wherein said plate is at least in part of heat conductive metal.

20. The AC photovoltaic module in accordance with claim 17 wherein said circuit board and said capacitor means are embedded in a pottant.

* * * * *